Sept. 26, 1939.  E. J. LOCKWOOD  2,173,850
METHOD OF PRODUCING A FROZEN CONFECTION
Filed Dec. 18, 1933   2 Sheets-Sheet 1
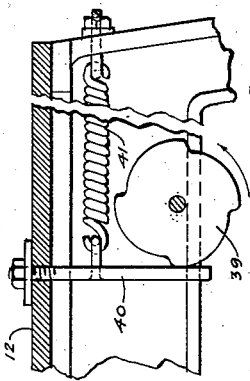
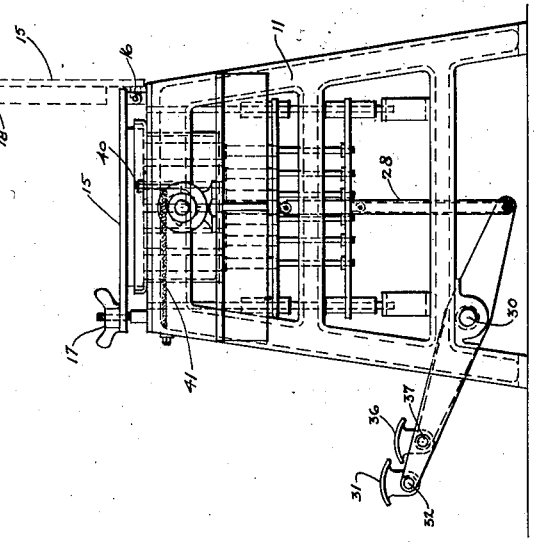
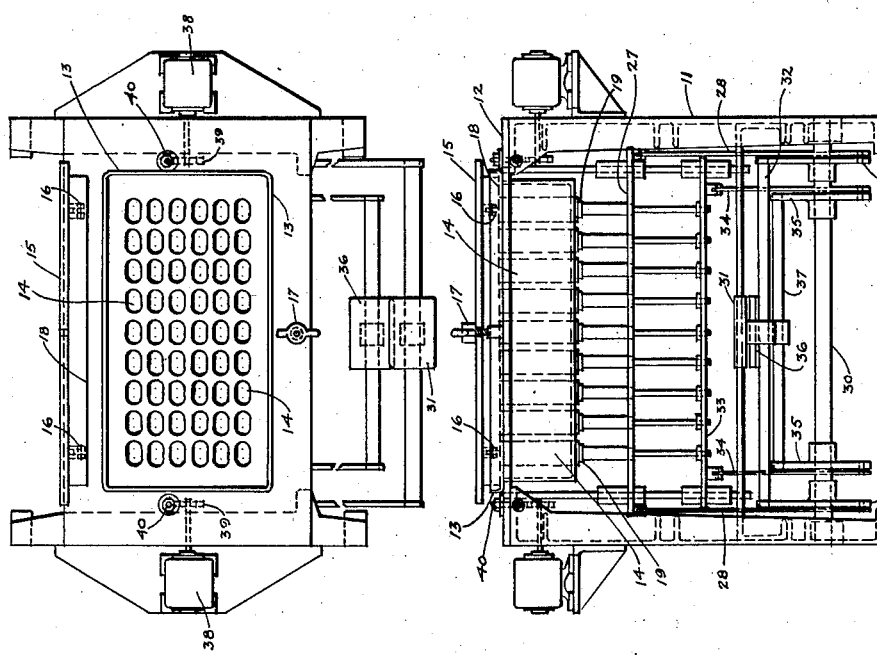
INVENTOR.
Edwin J. Lockwood
BY
Paul R. Ames
ATTORNEY.

Sept. 26, 1939.  E. J. LOCKWOOD  2,173,850
METHOD OF PRODUCING A FROZEN CONFECTION
Filed Dec. 18, 1933   2 Sheets-Sheet 2
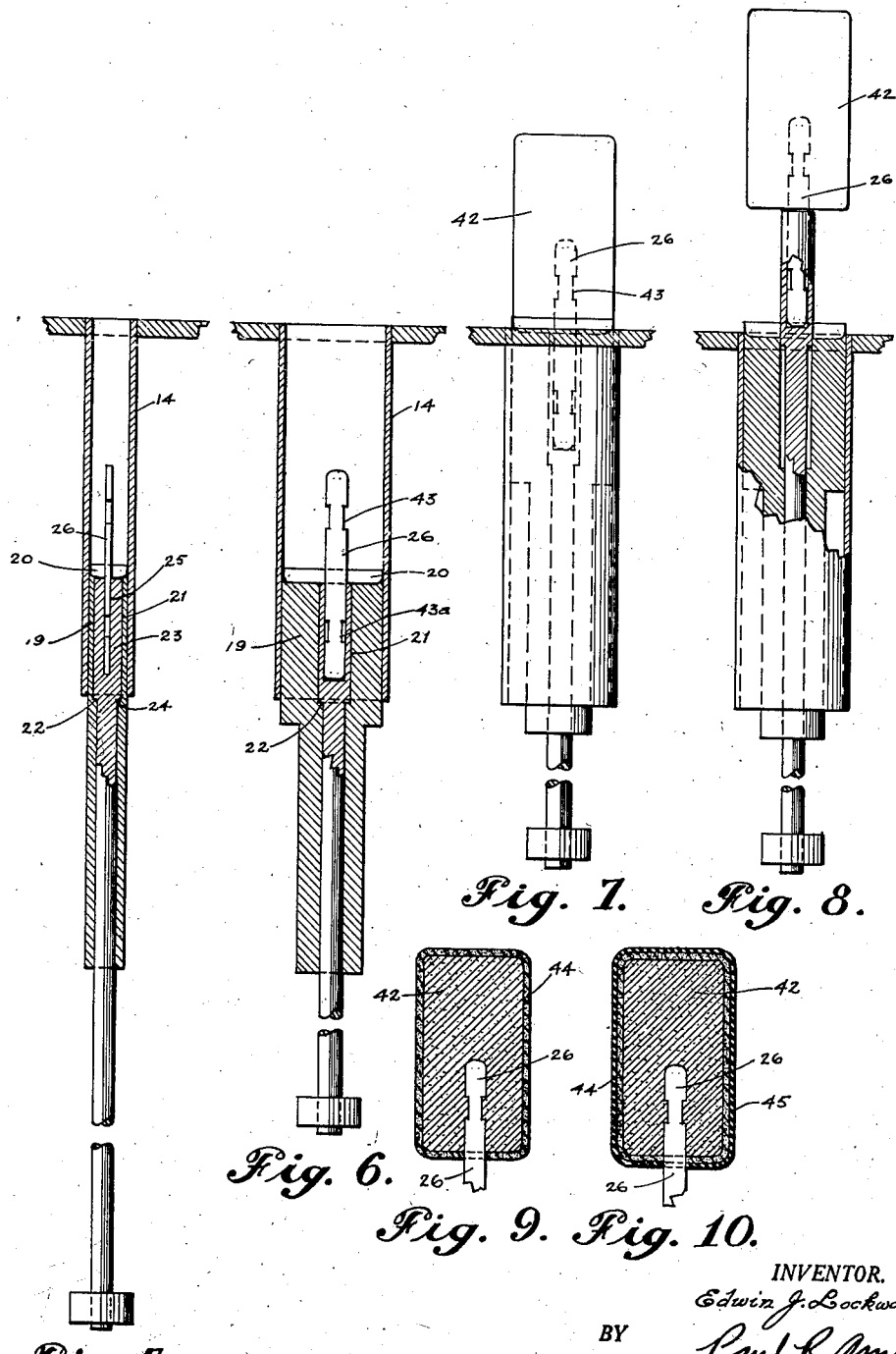
INVENTOR.
Edwin J. Lockwood
BY Paul R. Ames
ATTORNEY.

Patented Sept. 26, 1939

2,173,850

UNITED STATES PATENT OFFICE 2,173,850

METHOD OF PRODUCING A FROZEN CONFECTION

Edwin J. Lockwood, Peekskill, N. Y., assignor to The Borden Company, New York, N. Y., a corporation of New Jersey Application December 18, 1933, Serial No. 702,887

3 Claims. (Cl. 107—54)

This invention relates to the production of an improved frozen confection and also to such a confection applied to a stick or handle.

In the preparation of frozen confections on a stick, it has been the practice to position the stick within a form and to pour the liquid to be frozen into the form and to freeze it around the stick. In view, however, of the difficulties involved in quickly freezing under such conditions and the difficulty of removing the product from the form, such practice presents numerous disadvantages. It is an object of the present invention to provide a new method for producing a frozen confection on a stick whereby the production of such a product may be greatly simplified and hastened. Other objects will become apparent.

In carrying out my improved process for producing the confection on a stick, the confection may be frozen in any suitable manner, preferably with agitation or whipping, and may then be compressed around the stick by external pressure. If desired, the compressed confection may then be dipped into a partially frozen confection and subjected to a sufficiently rapid freezing to solidify this outer layer of confection. The latter operation may be repeated, if necessary, to build up the desired thickness of the outer frozen confection upon the inner frozen core. The frozen core, either with or without the outer layer of added frozen confection, may be dipped in or sprayed or otherwise coated with molten chocolate, or some other flavored syrup which is solid at normal temperatures, to provide a solidified coating around the frozen confection adapted to cover and protect it.

In describing the invention specific illustrations will be given, although it is not intended to restrict it to the particular embodiments described, since many modifications of the method will be apparent to one skilled in the art. In the drawings Figure 1 is a top plan view of a molding apparatus adapted to be used in producing my improved product, with the cover raised. Figure 2 is a side elevation of the apparatus illustrated in Figure 1 with the cover lowered. Figure 3 is a side elevation of the apparatus shown in Figure 2 with the cover also shown in dotted lines in the raised position. Figure 4 is a detailed view of the device for vibrating the mold. Figure 5 is an enlarged section through the middle of one of the molds. Figure 6 is a section at right angles to the section shown in Figure 5 and through the middle of the mold. Figure 7 is an enlarged elevation of one of the molds with the piston raised. Figure 8 is a view similar to Figure 7 with the plunger raised and with a portion of the mold and piston broken away and shown in section. Figure 9 is a section through the frozen product with a coating of frozen confection applied to the core. Figure 10 is a view similar to Figure 9 with a coating of normally solid confection applied to the outer layer of frozen confection.

In the drawings, the frame 11 supports a plate 12 in such a manner that the plate may be vibrated thereon. The plate 12 is provided with raised portions 13, 13 and a plurality of straight sided molds 14 shaped to give the desired configuration to the frozen confection. The upper ends of the molds 14 are closed by a cover 15 hinged at 16 and having a locking means 17 adapted to retain the cover in closed position when the pressure is applied to the product. The bottom surface of the cover may be given any desired configuration to give the required shape to the upper end of the product. In the illustration the bottom surface is a flat surface 18 adapted to contact with the surface of the plate 12.

Movable plungers 19 are normally positioned in the lower portion of each mold 14. These plungers are provided with upper surfaces 20, adapted to give the desired shape to the lower end of the product, and with openings 21 extending through the plunger and provided with shoulders 22. A piston 23 having a shoulder 24 is positioned in each opening 21 and is provided with a recess 25 shaped to receive the lower end of the stick or handle 26.

The plungers 19 are raised by the bar 27 actuated by the pivotally connected levers 28, 28 which are also pivotally connected at their other ends to the inner ends of the levers 29, 29, which latter are pivoted on the bar 30. A pedal 31 is provided on the bar 32 connecting the outer ends of the levers 29, 29. The pistons 23 are raised with the plungers 19 by the shoulders 22 and 24 and may be further raised by the bar 33 actuated by the pivotally connected levers 34, 34 which are also pivotally connected at their other ends to the inner ends of the levers 35, 35, which latter are also pivoted on the bar 30. A pedal 36 is provided on the bar 37 connecting the outer ends of the levers 35, 35.

The plate 12 may be vibrated by the motors 38, 38 which rotate the cams 39, 39 contacting with the levers 40, 40 fixed to the plate 12. Tension springs 41, 41 fixed to the levers 40, 40 and the frame 11 maintain the levers 40, 40 against the cams 39, 39.

In using the above device, the frozen confection on a stick may be prepared as follows:

The confection, which may be a water ice, a sherbert or other confection normally liquid but adapted to be solidified upon cooling, may be frozen in an ordinary freezer or by other suitable means, such, for example, as by rotating a chilled cylinder in a quantity of the liquid to be frozen and scraping the frozen material from the surface of the cylinder. In either case the material is preferably agitated or whipped while being frozen. With an ice the freezing is preferably carried to such an extent that the ice has about the consistency of dry snow, without any apparent moisture. This frozen material is then introduced into the several molds, the plungers 19 being withdrawn to their lowermost position and the sticks 26 being inserted in the recesses in the pistons 23 so as to project the desired distance into the mold. It is preferable to horizontally vibrate the molds by rotating the cams 39, 39 as or after the mold is filled with the added material. This causes the material to settle and completely fill the mold, thus avoiding voids or air pockets in the product. Also, by applying this vibration, a shorter stroke of the piston is required to give the same compression of the material. In some instances it may be preferred to vibrate vertically as well as, or instead of, horizontally.

Each mold should be provided with a vent, which may be of minute size, for the escape of air during the compression of the frozen material. If preferred, the frozen confection may be formed into a block and may be forced into the molds by a vertically moving cover.

After the frozen confection is in the mold, the cover 15 is lowered and secured by the fastener 17. The pedal 31 is depressed then to raise the plungers 19 and the pistons 23 to compress the frozen confection about the sticks or handles 26. After sufficient pressure has been applied to compress the mass about the stick, the pressure may be released and the cover 15 may be raised. The plungers 19 and piston 23 may then be raised further to discharge the frozen confection from the molds as illustrated in Figure 7. The pistons 23, 23 may then be advanced further, by further depressing the pedal 36, to lift the confection from the plunger.

The means for compressing the frozen material about the stick may, of course, be varied in many ways. In some instances it may be desirable to provide warming means to facilitate the action of the press. The lower closure for the mold (with the stick positioned in it and with means such as the pistons 23 for discharging the product) might be fixed and the upper closure may be movable, or the sticks might be supported in the upper closure for the mold and the material could be compressed by moving it or by moving the lower closure toward it, or the walls of the mold might be movable to contract the space within the mold. The latter means may be particularly desirable in the preparation of products having irregular shapes. For example, a block of frozen confection may be placed between movable mold sections of suitable configuration to give the desired shape to the product. The mold sections may then be forced together, the excess of the frozen confection being extruded from the molds. In some instances it may be preferred to omit the sticks or handles.

The product prepared as described above will have a body portion 42 of the frozen confection and a holder or stick 26 extending into it. This stick is preferably flat and provided with notches 43 to assist in retaining the frozen mass. In some cases it is unnecessary to use notches in the sticks and if desired, paraffin or other coating material may be applied to the sticks to prevent the flavor of the wood from penetrating into the frozen confection. Notches 43a, which are preferably the same as the notches 43 so that the sticks may be reversible, may be made in the other end of the stick and will assist in gripping the sticks in the subsequent dipping operations. For example, a rack may be provided to grip a number of the sticks at the lower notches which may then be turned over for dipping. Many other shapes of sticks may, of course, be used, for example, more notches may be included if necessary, or the stick may be provided with grooves, preferably transverse, or they may be tapered with the broad ends of the sticks projecting into the frozen mass.

By freezing the confection and subsequently compressing it, I obtain a product which is of finer texture than a product frozen while quiescent and one which is lighter because of the air beaten into it during the freezing operation.

The above operation is particularly adapted to the treatment of water ices, sherbets and other materials of low butter fat content. However, by freezing at a lower temperature and increasing the pressure, it may also be used with materials containing higher butter fat content. It is preferred to freeze the confection in such a manner that the resultant mass, which is to a greater part comprised of minute crystal formations, is relatively dry although a crystal mass containing greater quantities of moisture may be used. In this event it may be desirable to apply greater pressure to remove the additional liquid and it may be necessary to perforate the mold or provide other means for the withdrawal of the expressed liquid.

The present confection, after being applied to the stick, may, if desired, be dipped in a partially frozen confection which may be frozen thereon by the application of further cooling to the outside layer of confection. This freezing may be quickly accomplished because of the low temperature of the first portion of frozen confection and the resultant freezing of the relatively thin layer of partially frozen confection from both sides.

Figure 9 illustrates such a product. The inner body portion or core 42 may, for example, be of frozen water ice prepared as described above and the layer 44 may be of ice or of ice cream or other frozen confection of high butter fat content. If desired, the initially frozen confection, or core, may be repeatedly dipped in a partially frozen confection with sufficient cooling between each dipping or after several dippings to solidify the layer of confection applied by the dipping operations. If desired, these applied layers may be of different flavors from that of the confection beneath them.

This method of applying a layer of frozen confection to a previously frozen core may be utilized with frozen cores produced other than as described herein, for example, a core of ice cream or ice, with or without a stick, and frozen and molded or shaped in any suitable manner may be dipped in a partially frozen confection and the layer of confection added thereby may be congealed.

The body portion 42 of the frozen confection, with or without the added layers 44, may be dipped in a molten sugar syrup of any desired flavor or a chocolate or other flavored coating material which will congeal upon cooling to normal temperatures and the material may then be withdrawn. When the material is rapidly dipped and withdrawn the product will be provided with a solidified protective coating around the outside of the frozen confection. Figure 10 illustrates such a product in which the coating 45 of normally solid confection is applied to a layer 44 of frozen confection upon a core 42 of frozen confection.

If desired, the material supplied to the molds 14 may be compressed to the desired shape without inserting a stick, thus giving a compressed frozen confection adapted to retain the shape of the mold. This may be dipped in a partially frozen confection and/or a normally solid confection as described above.

In applying the partially frozen confection to the core of frozen confection, the former may be placed in a mold of desired shape in such quantity that when the frozen core is inserted, the partially frozen material will be forced around the core and into the recesses of the mold to give a product of the shape of the mold. Also, if preferred, the core of frozen confection may be dipped in the partially frozen confection and quickly inserted in a mold and solidified thereon, so that upon solidification it will have the exact shape of the mold. Other methods or means for applying the layers of frozen confection may also be used.

It is apparent from the above that many modifications of the invention may be made and it is not intended to limit it to the specific features described. In using the term "stick" in the above description and the claims, it is intended to include any suitable holding device adapted to project into the confection, which might be of wood, metal, compressed paper, candy or other suitable material. In referring to "crystalline structure" in the above description and in the claims, it is intended to include not only ices and sherbets and such substances in which crystals are apparent, but also substances of higher butter fat content, such as ice cream and which contain crystals of such minute sizes as not to be apparent in the frozen emulsion. The terms used in describing the invention have been used in their descriptive sense and not as terms of limitation and it is intended that all equivalents thereof be included within the scope of the appended claims.

What I claim is:

1. A method of producing a frozen confection comprising incorporating air in and freezing the confection to a relatively dry mass of fine crystals, placing said mass in a mold, vibrating the mass, and compressing the mass into a substantially solid molded body.

2. A method of producing a frozen confection comprising incorporating air in and freezing the confection to a relatively dry mass, placing said mass in a mold, vibrating the mass, and compressing the mass about a stick into a compact molded body.

3. A method of producing a frozen confection comprising incorporating air in and freezing the confection to a relatively dry mass, placing said mass in a mold, vibrating the mass, compressing the mass into a compact molded body, and providing said body with a coating of a frozen confection.

EDWIN J. LOCKWOOD.